(12) United States Patent
Chen et al.

(10) Patent No.: US 8,886,132 B2
(45) Date of Patent: Nov. 11, 2014

(54) CONTROLLING POWER SAVING MODE IN RADIO

(75) Inventors: Mingyu Chen, Solna (SE); Christoffer Rodbro, Stockholm (SE); Soren Vang Andersen, Luxembourg (LU)

(73) Assignee: Skype, Dublin (IE)

( * ) Notice: Subject to any disclaimer, the term of this patent is extended or adjusted under 35 U.S.C. 154(b) by 79 days.

(21) Appl. No.: 13/043,125

(22) Filed: Mar. 8, 2011

(65) Prior Publication Data

US 2012/0231747 A1      Sep. 13, 2012

(51) Int. Cl.
| | |
|---|---|
| *H04B 1/00* | (2006.01) |
| *H04B 7/00* | (2006.01) |
| *H04W 52/02* | (2009.01) |
| *H04M 1/253* | (2006.01) |

(52) U.S. Cl.
CPC ............ *H04W 52/0258* (2013.01); *Y02B 60/50* (2013.01); *H04M 1/2535* (2013.01)
USPC .......... 455/68; 455/343.1; 455/550.1

(58) Field of Classification Search
USPC .............. 455/68, 343.1, 550.1, 572, 573, 574
See application file for complete search history.

(56) References Cited

U.S. PATENT DOCUMENTS

| | | | | |
|---|---|---|---|---|
| 6,594,241 | B1 * | 7/2003 | Malmlof | 370/329 |
| 7,460,891 | B2 * | 12/2008 | Koch et al. | 455/574 |
| 7,760,676 | B2 * | 7/2010 | Demirhan et al. | 370/311 |
| 7,800,494 | B2 * | 9/2010 | Kim | 340/539.12 |
| 7,839,882 | B2 * | 11/2010 | Soliman | 370/437 |
| 2004/0076177 | A1 | 4/2004 | Koch et al. | |
| 2007/0178875 | A1 | 8/2007 | Rao et al. | |
| 2011/0128865 | A1 * | 6/2011 | Doppler et al. | 370/252 |

FOREIGN PATENT DOCUMENTS

WO     WO-2007149732      12/2007

OTHER PUBLICATIONS

"International Search Report and Written Opinion", Application No. PCT/EP2012/054024, (May 29, 2012), 10 pages.

* cited by examiner

*Primary Examiner* — Tuan H Nguyen
(74) *Attorney, Agent, or Firm* — Sonia Cooper; Jim Ross; Micky Minhas

(57) ABSTRACT

The disclosure relates to controlling the operational mode of a radio in a wireless device, with an aim to reducing power consumption. A method of controlling the operational mode of a radio in a wireless device, includes executing at least one application, that provides access information for use by radio control logic to determine an operational mode of a radio, where the said access information defines usage of the radio by that application.

29 Claims, 3 Drawing Sheets

CONTROLLING POWER SAVING MODE IN RADIO

FIELD OF THE INVENTION

The present invention relates to controlling the operational mode of a radio in a wireless device, with an aim to reducing power consumption.

BACKGROUND OF THE INVENTION

As is known, for wireless communication in a cellular network, the network includes base stations which manage communications between mobile devices. According to the long term evolution (LTE) Standards developed as part of the 3GPP Standard, a mechanism has been introduced in an attempt to save power at the mobile devices. There is an ongoing requirement to reduce power consumption of such mobile devices as the quantity of data transmitted over the wireless network steadily increases. According to the approach adopted in the LTE Standard, a wireless device can initiate a discontinuous reception (DRX) and/or discontinuous transmission (DTX) which allows it to turn the radio to a sleep state for long periods, based on some predetermined inactivity timer values negotiated with the base station. In the LTE Standard, the base station is referred to as an e Node B (eNB).

However, these inactivity timer values are too generic and cannot take into account specific network traffic activity occurring at the wireless device at any given time.

It is an aim of the present invention to enhance power saving for a radio access device.

SUMMARY OF THE INVENTION

According to an aspect of the present, there is provided a method of controlling the operational mode of a radio in a wireless device, the method comprising:

executing at least one application, said application providing access information for use by radio control logic to determine an operational mode of a radio, wherein said access information defines usage of the radio by that application.

A further aspect of the invention provides a computer program product comprising program code means constituting an application which when executed by a processor provides access information for use by radio control logic to determine an operational mode of a radio, wherein said access information defines usage of the radio by the application.

A further aspect of the invention provides a wireless device comprising:

a radio for communicating over a wireless channel;

a processor arranged to execute at least one application requiring communication via the radio, wherein when executed, the application provides access information for use by radio control logic to determine an operational mode of the radio, wherein said access information defines usage of the radio by that application.

Another aspect of the invention provides a method comprising the operational mode of a radio in a wireless device, the method comprising:

executing at least one application, said application generating at least one type of data for transmission from the wireless device using the radio, the data being output to radio control logic for transmission at intervals determined by the application;

determining the type of data generated for transmission; and the application adjusting the interval based on the type of data.

Another aspect of the invention provides a wireless device comprising:

a radio for communication over a wireless channel; and a processor arranged to execute at least one application requiring communication via the radio, wherein, when executed, the application is configured to generate at least one type of data for transmission from the wireless device using the radio, the data being output to radio control logic for transmission at intervals determined by the application, the application further configured to determine the type of data generated for transmission and to adjust the interval based on the type of data.

Another aspect of the invention provides a computer program product comprising program code means constituting an application which when executed by a processor generates at least one type of data for transmission using a radio, the data being output for transmission at intervals determined by the application, the application further determining the type of data generated for transmission and adjusting the interval based on the type of data.

For a better understanding of the present invention and to show how the same may be carried into effect, reference will now be made by way of example of to the accompanying drawings.

DESCRIPTION OF THE PREFERRED EMBODIMENT

Figure 1:
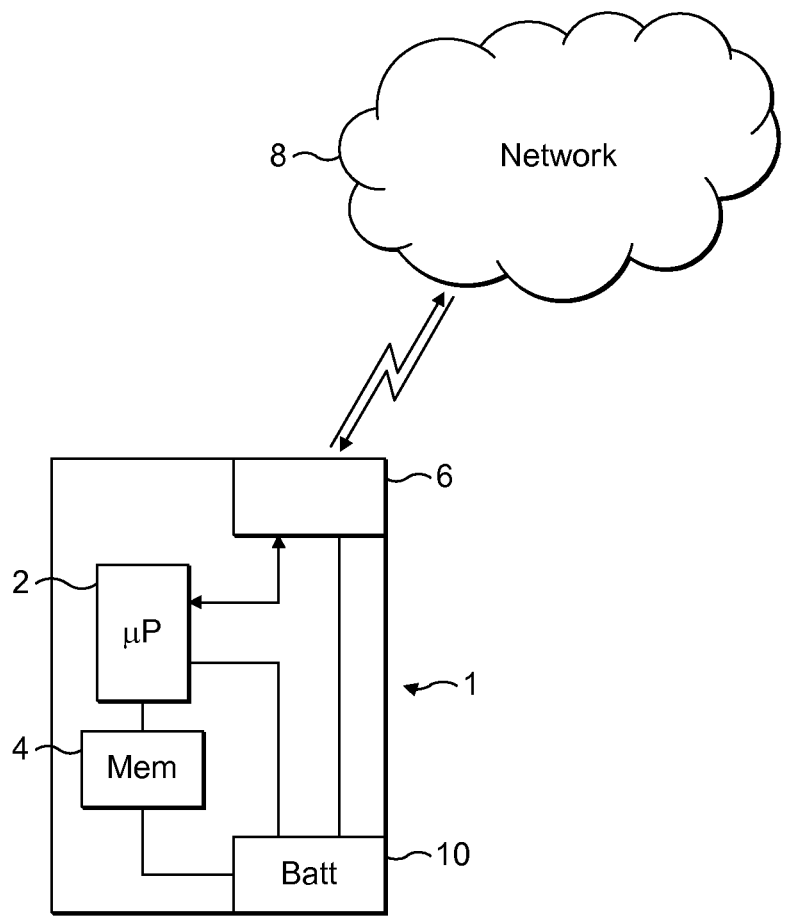
FIG. 1 is a schematic illustration of a wireless device in communication with a network.

A wireless device is illustrated schematically in FIG. 1. The wireless device 1 includes a microprocessor 2 which executes programs in the form of code which can be held locally in the microprocessor 2 or in a memory 4 connected to it. The mobile device 1 has a radio access chip 6 for transmitting and receiving radio frequency (RF) communications, for example, between the mobile device 1 and a network 8. The mobile device 1 has a power supply which can be in the form of a battery 10 which is illustrated, and/or a connection to an external power supply (not shown).

It would be apparent that the mobile device can include many other elements which are not illustrated because they are not germane to the present context.

RF communications between the mobile device 1 and the network 8 take place by transmitting and receiving RF signals over radio channels by the radio access chip 6. When transmitting or receiving over a channel, the radio needs to be powered on. However, when the radio is not being used, it can be powered down or enter a power saving mode to reduce the power consumption of the device 1.

Figure 2:
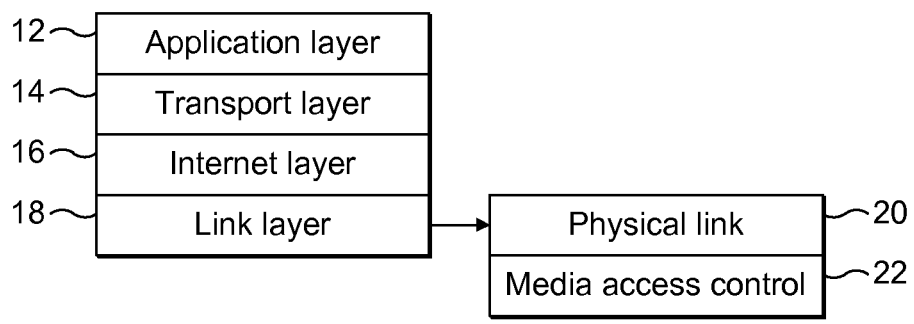
FIG. 2 is a schematic description of layers in a protocol stack.

The invention will now be described in the context of a wireless device of the type discussed in relation to FIG. 1. The wireless device can be any piece of user equipment (UE) which supports at least one radio access technology, for example, UMTS, HSDPA, Wimax, LTE or Wifi. Software for execution by the processor is organised in a protocol stack of the type illustrated in FIG. 2. FIG. 2 illustrates only one example of a stack—there are many variations currently in use and the invention can be applied in any type of stack. The stack exemplified in FIG. 2 includes an application layer 12, a transport layer 14, an Internet layer 16 and a link layer 18. The link layer is subdivided into a physical link layer 20 and a media access control (MAC) layer 22.

The link layer is responsible for organising communication technologies for the device 1. The media access control layer 22 within the link layer 18 is responsible for addressing, assigning multiple channels to different users and avoiding collisions, amongst other things. In particular, it is responsible for controlling the operational mode of the radio. It contains a buffer for queuing data to be transmitted and control logic, discussed more fully later. Each layer can communicate with its equivalent layer in a different wireless device—the link layer 18 communicates with a corresponding link layer in a different device at the level of RF data in the form of frames. Frames are transmitted and received over a channel between the radio access chip 6 and the network 8, each access requiring the radio device to be powered on. An "access" denotes a state in which the radio access chip is in communication with the network 8 or another device such that data can be transmitted and/or received. According to LTE Standard implementing DRX/DTX as discussed above, if the link layer had not sent anything for the negotiated time interval, the radio may have powered down or entered into a power saving mode.

This could have the effect that the radio is powered down or enters a power saving mode just before a next access, for example, an attempt to transmit frames over the channel by the media access control layer. This can result in unnecessary switching between operational modes of the radio. Further, each time the radio "wakes up" it advises the node 8 or base station, so unnecessary mode changes can cause an increase in signalling overhead to the node B or base station.

Embodiments of the invention provide an improvement over this arrangement as described in the following. First, however, the other layers in the stack will be described.

The Internet layer provides Internet communications in the form of packets carrying IP (Internet Protocol) data with IP headers, and is responsible for IP addressing.

The transport layer 14 runs host to host communications according to the transmission control protocol (TCP) or a user datagram protocol (UDP), for example. In this context, a host is any kind of user equipment seeking to communicate wirelessly.

The application layer 12 handles application-based interactions on a process-to-process level between communicating hosts. It is this layer that runs user applications which may generate data to be transmitted over the channel. Thus, embodiments of the invention are described in the context that a user equipment runs at least one application that connects to the Internet 8 through at least one of the radio access technologies through the media access control layer 22.

The invention can be used with a number of different applications, but one particular context concerns social communications, such as VoIP (Voice over Internet Protocol) calls between UE's, instant messaging (IM) chat or live meetings run over a conference framework. Alongside these kind of services, applications can be responsible for data transfer, such as file transfer, updating presence information for contacts in a social network, or control data such as "keep-alive"

data. References to applications running in the application layer in the present case are considered to encompass all such possibilities.

In the described embodiments of the invention, an application running in the application layer 12 notifies the MAC layer 22 about anticipated future data transmission or receptions. This allows the MAC layer to adapt its radio power saving schedule to the application's channel access. The MAC layer has a power saving schedule comprising different operational modes including power saving modes, such as sleep, idle, DRX/DTX. By notifying the MAC layer 22 of planned channel access, a number of advantages can be achieved. First of all, power saving modes can be entered immediately when an application has finished without having to wait for a time-out mechanism to activate the power saving mode. This saves power. Secondly, the MAC layer can suspend power saving, or avoid going into a deeper power saving mode (e.g., from "sleep" to "idle"), if the application reports activity in the near future. This is useful because it may take time and power to wake up the radio from a power saving mode.

Figure 3:
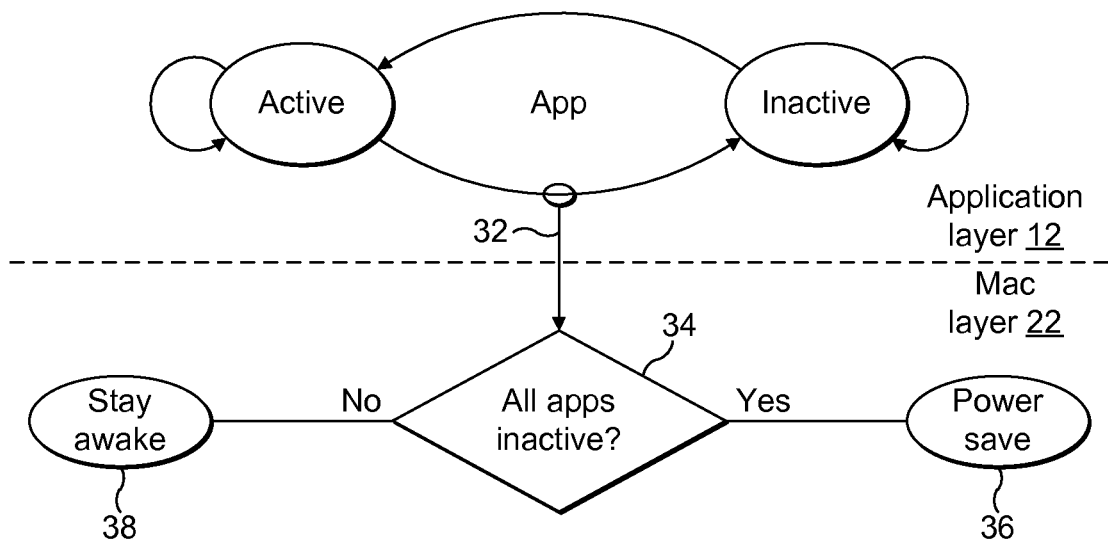
FIG. 3 is a schematic diagram of an application layer communicating with a MAC layer.

One embodiment of the invention will be described with reference to FIG. 3. In this embodiment, an application 30 running in the application layer has two basic states: an active state in which it needs constant radio access, and an inactive state where it does not. As examples, consider communication sessions in applications such as IM chat, VoIP calls, live meeting. An inactive state denotes the end of a current application session. Whenever the application 30 switches from the active state to the inactive state, it generates a notification 32 to notify the MAC layer 22 of the inactive state to allow the MAC layer 22 to go into a power save mode immediately. As one option, it can send a DRX trigger message to the base station eNB. The MAC layer 22 includes control logic 34 which is arranged to receive notifications from a plurality of applications running in the application layer and to determine if a situation arises when all such applications are inactive. If so, the control logic 34 causes the MAC layer 22 to adopt a power save mode 36. If there remain applications which are active, the decision logic 34 causes the MAC layer to adopt a stay awake mode 38 for the radio.

When going from inactive to active, an application may notify the MAC layer 22 explicitly, or simply provide data to it.

Determining if an application is entering an inactive state is not necessarily straight forward. In a situation where an application comprises a number of parallel services which are typically not coordinated, an application can monitor all of its services before sending an "inactive" notification 32. As an example, a VoIP application may end one service, a call where a user hangs up, but another service, for example, presence information updating, starts shortly after. An inactive state of a VOIP application can be determined for example in one of the following states: (i) at the end of a call; (ii) when presence synchronisation is complete; and (iii) when file transfer is complete.

Alternatively, to allow the radio to go into power save mode, the application may choose to suspend non-essential services if it determines that only non-essential services are running. Additionally, this decision can take battery status information (obtained via the operating system) in account, so that non-essential services are suspended only when battery level is below a certain threshold.

In another embodiment of the invention, an application sends data at periodic (regular) intervals. For example, this could be keep alive data to avoid losing a connection to an external network if the device 1 sits behind a firewall. Another example is sending data at the audio codec frame rate in a Voice over IP application. The application notifies the MAC layer 22 about the periodicity and updates this every time it changes. If the application is running multiple services, to maintain periodicity, it may buffer data produced by one or more services to transmit it in synchronicity with another service that is producing data periodically. Information about periodicity can be supplied from a number of applications running in the application layer 12. This information is received by control logic 34 in the MAC layer 22. The control logic can estimate, from the periodicity and the last time the application sent data, the time until the next anticipated data transmission from that application. By combining these times for all applications, the time $t_{est}$ until any of the applications will send data can be estimated. control logic 44 can use the estimated time $t_{est}$ to decide whether it is worthwhile to switch into a power save mode 36 or to stay in a stay awake mode 38.

In particular, the MAC layer 22 can use the periodicity information in a number of ways. It can be used to understand which DRX/DTX cycle should be triggered, assuming that the wireless device is provided with options to make such a selection. Additionally and alternatively, it can be used by the wireless device to delay getting into idle mode by using a higher inactivity timer setting for idle mode. This is because it already knows that the idle mode would be interrupted by the next message from the application and would result in excessive signalling overhead due to network re-entry and a long DTX/DRX cycle instead may result in better power savings. Thus, this allows the wireless device to save power as well as signalling overhead.

An application may optimise use of such a mechanism by adapting the intervals at which it sends data to reduce the amount of time that the MAC layer requires the radio to be active. Assume that when the MAC layer places the radio in a stay awake (active) mode, it will remain active for a period of X milliseconds. If the application sends data at intervals Y milliseconds with Y>X, the radio will be awake X/Y of the time. Therefore, by increasing Y the awake time—and thus power consumption—can be decreased significantly. This is not the case for a system such as that described in the introductory part with reference to the CTE implemented DRX/DTX mechanism where power saving is based on time-outs because these time-outs have to be reasonably large (>Y) to avoid excessive power save mode switching when transmissions are not periodic. In such a situation, increasing Y would only lead to a higher delay but little power saving. If the data is real time data such as audio data transmitted during a call, Y may only be increased to a threshold value without causing audible delay in the receive signal.

If the transmission of data is not real time, such as file transfer, it may still be necessary to limit the transmission interval, so as not to overload the transmission buffer in the MAC layer 22.

The application may therefore determine the type of data that is being sent and apply a predefined interval between transmitting data to the MAC layer 22. The predefined interval will be dependent upon the type of data that is being sent. The interval need not be a function of the type of data alone, but may take other parameters into account as well. For example, return trip time (RTT) or knowledge about the MAC layer buffer size can be taken into account.

Figure 4:
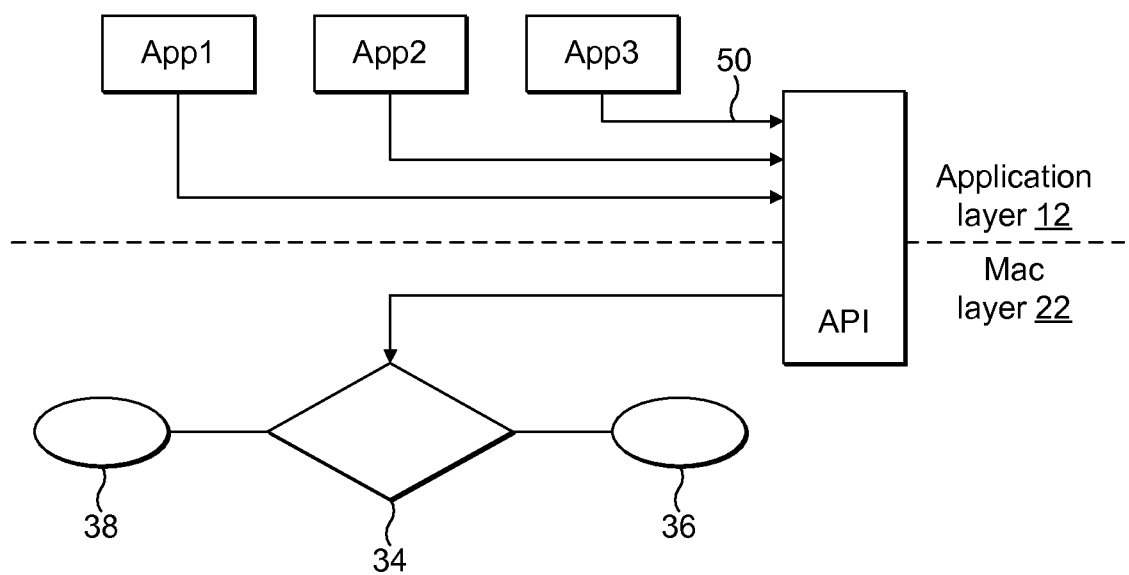
FIG. 4 is schematic diagram of an architecture for providing access information between an application layer and a MAC layer.

FIG. 4 illustrates an architecture by means of which access information can be supplied from the application layer 12 to the MAC layer 22. FIG. 4 illustrates three applications, App1, App2, App3 running in the application layer and an application interface (API) which can be implemented for example, in the operation system of the wireless device. When an application has access information to supply to the MAC layer, it calls a function from the API which function allows data to be stored in a manner accessible by the API. This information can be supplied to the MAC layer 22 on request by the MAC layer control logic 34, or in any other appropriate way.

The architecture of FIG. 4 is also applicable to the following described embodiments of the invention.

According to another embodiment of the invention, an application running in the application layer notifies the MAC layer 22 about its current real time constraints. That is, a message 50 is passed from the application indicating the real time constraints or delay tolerance of the application. This is supplied to control logic 34 to decide if the radio should be in power save mode 36 or wake up mode 38. When a radio is in power save mode and data is received from the application layer, the radio can either wake up to send the data immediately, or it can stay in power save mode and wait for more data to transmit all in one go. The latter is more power efficient because it leads to more time in the power save mode and less switching between modes. On the other hand, for real time data such as in a VoIP application, the induced waiting time may degrade conversation quality. By providing the real time constraints/delay tolerance from the application to the MAC layer, the MAC layer can make a more informed decision in control logic 34 as to whether or not to switch out of the power saving mode.

Real time constraints can change over time for different reasons. For example, even a VoIP application which is not currently running a call will often be transmitting data to avoid losing a network connection, to update presence information for contacts or to run other services such as file transfer. All such data has no real time constraints, so as long as only this type of services are running, the MAC layer should be notified of a high delay tolerance. Moreover, it is known that conversation degradation does not increase linearly with the round trip time (RTT) but rather exponentially. Therefore the application may determine the delay tolerance in dependence on RTT. For example, if the current RTT is very low, adding a few tenths of milliseconds to it will have only little impact on conversation quality and is thus acceptable to reduce power consumption. If the application is running multiple services (S) the real time constraints for these services should be aggregated into one. Preferably, the strictest real time constraint is used.

Round trip time is a known transmit delay parameter which can be determined in a number of different ways. For example, the transmission time for a packet ("timestamp") can be added to its payload. The receiver will then extract this timestamp and return it to the transmitter in another packet, after which the transmitter can estimate the RTT as the difference between the reception time of the fed back packet and the timestamp.

Figure 5:
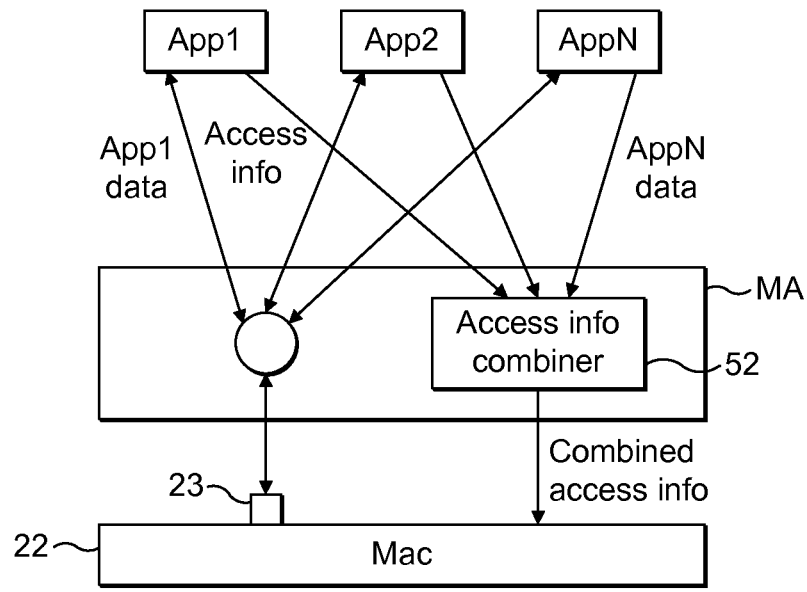
FIG. 5 is a schematic diagram of a first architecture for implementing a meta-application.

The above embodiments of the invention can be implemented using a specialised meta-application designed to interoperate with the MAC layer 22. The meta-application provides a specialised way of communicating information from a plurality of applications to the MAC layer. One architecture is illustrated in FIG. 5. According to this architecture, a plurality of applications App1, App2 . . . AppN register with a meta-application MA. The meta-application can run in the operating system. The meta-application handles data coming from all of the applications and provides that data to a socket 23 on the MAC layer 22. The meta-application includes an access information combiner 52 which combines access information of the type discussed above and supplies it to the MAC layer 22. In this architecture, all communications between the application layer and the MAC layer are handled by the meta-application. This can be done through an API as described with reference to FIG. 4.

Figure 6:
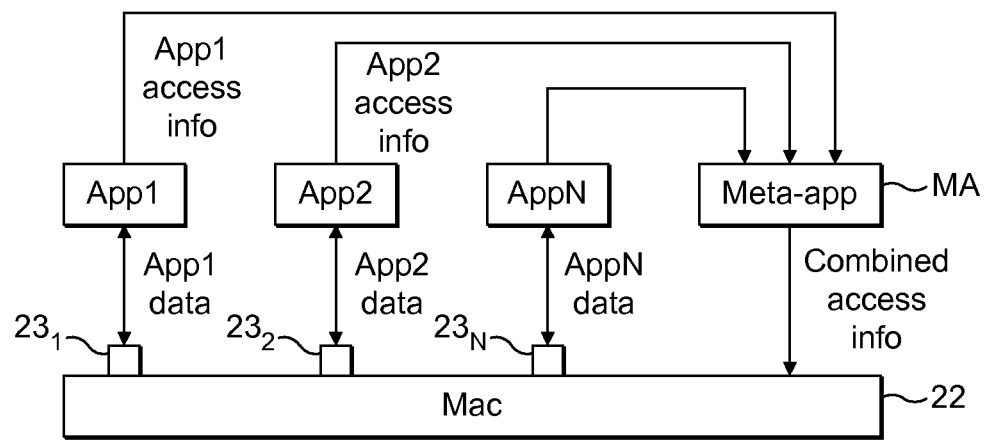
FIG. 6 is a schematic diagram of a second architecture for implementing a meta-application.

FIG. 6 illustrates an alternative architecture where each application App1, App2 . . . AppN communicates its data to the MAC layer 22 by individual IP sockets 23 1, 23 2 . . . 23 N. Access information is supplied from each application to the meta-application MA, which supplies combined access information to the MAC layer 22. In this architecture, the applications run a negotiation of MAC access frequency and timing/phase point with the meta-application, based on which the meta-application informs the MAC layer. The meta-application informs the MAC layer about activity/inactivity and periodicity that all applications will subsequently adhere to in their operation.

In the embodiment discussed above where the access information is periodicity, the periodicity of a number of applications may be compared in the meta-application. The meta-application can then report the combined periodicity of the applications to the MAC layer 22. For example, two applications may each connect to the Internet every ten seconds, wherein the applications are half a circle out of phase. In this case, the meta-application will determine that the combined rate at which the applications connect to the Internet is every five seconds. This is reported to the MAC layer 22 such that the MAC layer can then control when the radio should go into an inactive state.

Any application running on the user equipment can register on the meta-application. In this way, all the registered applications can be considered as services running within the meta-application.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   determining access information defining usage of a radio by an application for use by radio control logic to determine an operational mode of the radio, said access information indicating a data transmission schedule for the application determined based on data transmission scheduling information received from the application as part of a notification that identifies at least one scheduled switch between an active data transmission state and an inactive data transmission state of the application; and providing the access information for receipt by the radio control logic.

2. A method according to claim 1, wherein the step of providing comprises:
   calling a function in an application program interface and supplying said access information to the called function.

3. A method according to claim 1, wherein a meta-application receives the access information from said application and provides the access information for use by the radio control logic.

4. A method according to claim 3, wherein the meta-application receives the access information from a plurality of applications and processes it to provide consolidated access information for use by the radio control logic.

5. A method according to claim 4, wherein the applications individually supply data for transmission using the radio to a radio access control function.

6. A method according to claim 4, wherein each application supplies data for transmission using the radio to the meta-application, which supplies said data to a radio access control function.

7. A method according to claim 1, wherein the application provides a plurality of services, the application monitoring the plurality of services to determine when to issue said notification.

8. A method according to claim 7 wherein the application suspends non-essential services if it determines that only non-essential services are running.

9. A method according to claim 1, wherein the application suspends non-essential services if it determines that only non-essential services prevent the inactive state.

10. A method according to claim 9, wherein the application determines whether to suspend non-essential services by taking into account battery status.

11. A method according to claim 1, wherein said notification is generated by the application being in at least one of the following states: at the end of a call; when presence synchronisation is complete; or when file transfer is complete.

12. A method according to claim 1, wherein the access information comprises an indication of a periodicity of data transmission from the application.

13. A method according to claim 12, wherein the application provides a plurality of services, and wherein data of at least some of said services are buffered in order to be transmitted in synchronicity with another service that is generating data periodically.

14. A method according to claim 12, wherein the application determines the type of data to be transmitted and adjusts a periodic interval for transmitting said data based on the type of data, the periodic interval being included as part of the access information.

15. A method according to claim 14, wherein the periodic interval is adjusted based on transmit delay parameters.

16. A method according to claim 1, wherein the access information comprises a level of delay tolerance.

17. A method according to claim 16, wherein the application adjusts the level of delay tolerance based on at least one transmit delay parameter.

18. A method according to claim 16, wherein the application provides a plurality of services, and the level of delay tolerance is provided as part of the access information and depends on a current service being provided by the application.

19. A storage device storing program code that is executable by a processor to perform operations comprising: providing access information for use by radio control logic to determine an operational mode of a radio, said access information defining usage of the radio by the application and including a schedule of data transmission by the application determined based on scheduling information received from the application as part of a notification that identifies at least one scheduled switch between an active data transmission state and an inactive data transmission state of the application, the access information being usable to control a power state of the radio.

20. A storage device as recited in claim 19, wherein the notification includes an indication of a periodicity of data transmission from the application.

21. A wireless device comprising:
a radio for communicating over a wireless channel;
a processor; and
one or more storage devices storing instructions that are executable by the processor to cause the processor to perform operations including:
executing at least one application configured to communicate via the radio; and
providing access information to determine an operational mode of the radio, wherein said access information defines usage of the radio by the application and indicates a schedule of data transmission by the application determined based on scheduling information received from the application, the scheduling information indicating at least one scheduled switch between an active data transmission state and an inactive data transmission state of the application.

22. A wireless device according to claim 21 comprising an application program interface configured to receive a function call from the application, and the access information from the application.

23. A wireless device according to claim 21 wherein the processor is arranged to execute a plurality of applications and a meta application configured to receive access information from the plurality of applications and to process said access information to provide consolidated access information for use by the wireless device for controlling the radio.

24. A method comprising:
generating at least one type of data for transmission from a wireless device using a radio, the data being output to radio control logic for transmission according to a particular time interval determined by an application;
determining the type of data generated for transmission; and
adjusting the time interval for transmission of the data based on the type of data, with at least some different types of data being associated with different time intervals for transmission of data and the time interval for transmission of the data being adjustable based on one or more transmit delay parameters.

25. A method according to claim 24, wherein at least one of the transmit delay parameters is a round trip time.

26. A wireless device comprising:
a radio for communicating over a wireless channel;
a processor; and
one or more storage devices storing instructions that are executable by the processor to cause the processor to perform operations including:
executing at least one application configured to communicate data via the radio;
determining a type of data to be communicated for the application via the radio; and
adjusting a time interval for transmission of the data based on the type of data, with at least some different types of data being associated with different time intervals for transmission of data and the time interval for transmission of the data being adjustable based on one or more transmit delay parameters.

27. A wireless device according to claim 26 wherein the type of data comprises at least one of real time data or non real time data.

28. A storage device storing program code that is executable by a processor to perform operations comprising:
generating at least one type of data for transmission using a radio and at a particular time interval; and
adjusting the time interval based on the type of data, with at least some different types of data being associated with different time intervals for transmission of data and the time interval being adjustable based on one or more transmit delay parameters.

29. A storage device as recited in claim 28, wherein the one or more transmit delay parameters comprise a return trip time for data transmitted by the radio, and wherein the operations further comprise adjusting the time interval based on the round trip time.

* * * * *